United States Patent Office 2,863,850
Patented Dec. 9, 1958

2,863,850

POLYETHYLENE COMPOSITION

James W. Ragsdale, Texas City, Tex., assignor to Monsanto Chemical Company, St. Louis, Mo., a corporation of Delaware No Drawing. Application February 21, 1955
Serial No. 489,785

2 Claims. (Cl. 260—45.7)

This invention relates to polyethylene compositions. More particularly, the invention relates to polyethylene compositions having improved resistance to environmental stress-cracking.

The extraordinary electrical properties of polyethylene have led to its use in large quantities in electrical insulation fields. One of the important uses for the polyethylene is as a sheathing for electrical cable. However, it has been found that the polyethylene sheathing gradually develops surface cracks which weaken the insulating properties of the polyethylene. It has been found that environmental stress-cracking may be greatly accelerated by heating polyethylene sheets immersed in an alkyl aryl polyglycol ether at 50° C. On the basis of this discovery, a standard test method has been developed by the Bell Telephone Laboratories. The test is known as KS–4691, Method 13.

Test KS–4691, Method 13, consists essentially of molding a polyethylene under controlled conditions into sheets 1.5″ x 0.5″ x 0.125″. A slit 0.75″ long by 0.020–0.25″ deep is then made in one broad surface of the sheet. The sheet is then bent through 180° with the slit on the outside of the bend. The bent sheet is then inserted into a test tube filled with an alkyl aryl polyglycol ether such as the alkyl phenol ethylene oxide condensation products marketed under the trade name "Igepal." The tube and contents are heated at 50° C. until cracks in the polyethylene surface are visible to the naked eye.

Using this test on unmodified polyethylene, it is found that the resistance to environmental stress-cracking depends largely on the molecular weight of the polyethylene. Thus, below a molecular weight of about 22,000, cracking is severe and the material is substantially unusable as cable sheathing. Above 22,000, the cracking becomes less severe and above 30,000, the cracking is minor. However, even this minor amount of cracking causes failure of the polyethylene sheath as an insulating medium.

One object of this invention is to provide new polyethylene compositions.

A further object is to provide polyethylene compositions resistant to environmental stress-cracking.

These and other objects are attained by admixing the polyethylene with 0.5 to 2.0% by weight of a by-product of the mass polymerization process for preparing ethylene homopolymers and hereinafter referred to as "By-Product K."

*Example I*

Make three compositions by mixing separate portions of a polyethylene having a molecular weight of 30,000 to 35,000, as determined by the osmotic pressure method, with 0, 0.5 and 1.0% by weight, respectively, of by-product K. When a homogeneous mixture is obtained, mold the compositions into sheets 1.5″ x 0.5″ x 0.125″. Test these sheets by the Bell Telephone Laboratories Test KS–4691, Method 13. The sheets containing no by-product K show 60% failure in 100 hours in the test. The sheets containing 0.5% of by-product K show 40% failure within 100 hours and the sheets containing 1.0% by weight of by-product K show only 10% failure in 100 hours.

The by-product K of the example is an oily liquid hydrocarbon mixture obtained in small quantities in the mass polymerization of ethylene at elevated temperatures and pressures using oxygen as the polymerization catalyst. It is a hydrocarbon material having a density of about 0.800 at 25° C. and a viscosity of about 3–4 centipoises at 25° C. The material contains substantially no combined oxygen, i. e., no combined oxygen can be detected by infrared analysis but it does contain from 4 to 6% unsaturation as measured by infrared analysis. The unsaturation is randomly distributed and is non-conjugated. The amount of by-product K which is effective ranges from about 0.5 to about 2% by weight of the polyethylene.

By-product K is effective when used with polyethylene having a molecular weight of above about 22,000. Below this molecular weight, the cracking of the polyethylene sheath is so severe that although the by-product K materially decreases the cracking, the material is of little use as cable sheathing.

Various conventional additives may be incorporated into the polyethylene along with by-product K including pigments, dyes, lubricants, fillers and anti-oxidants or other stabilizers.

The foregoing and particularly the example is illustrative of this invention and it is obvious that many variations may be made in the compositions of the invention without departing from the spirit and scope thereof.

What is claimed is:

1. A process for improving the environmental stress-cracking resistance of polyethylene which comprises homogeneously mixing a homopolymer of polyethylene having a molecular weight above 22,000 with 0.5 to 2% by weight of an oily liquid hydrocarbon mixture by-product of the mass polymerization of ethylene at elevated temperatures and pressures in the presence of oxygen as the polymerization catalyst, said liquid having a density of about 0.800 at 25° C., a viscosity of about 3–4 centipoises at 25° C., from 4 to 6% unconjugated ethylenic unsaturation and substantially no combined oxygen.

2. A process as in claim 1 wherein the ethylene homopolymer has a molecular weight of 30,000 to 35,000 and the resulting composition contains 1% by weight of said hydrocarbon by-product.

References Cited in the file of this patent

FOREIGN PATENTS 471,590    Great Britain _____ Sept. 6, 1937